United States Patent
Johnson et al.

(10) Patent No.: US 6,890,965 B1
(45) Date of Patent: May 10, 2005

(54) FOAMED COMPOSITES AND METHODS FOR MAKING SAME

(75) Inventors: Lowell Frank Johnson, La Canada, CA (US); Roderick E. Hughes, Newport Beach, CA (US)

(73) Assignees: Hughes Processing, INC, Costa Mesa, CA (US); Jet Plastics, Inc., Los Angeles, CA (US)

( * ) Notice: Subject to any disclaimer, the term of this patent is extended or adjusted under 35 U.S.C. 154(b) by 151 days.

(21) Appl. No.: 10/188,497

(22) Filed: Jul. 2, 2002

(51) Int. Cl.$^7$ .................................................. C08J 9/32
(52) U.S. Cl. ........................ 521/54; 521/84.1; 521/134; 521/139; 521/140
(58) Field of Search .................... 521/54, 84.1, 134, 521/139, 140

(56) References Cited

U.S. PATENT DOCUMENTS

| | | |
|---|---|---|
| 3,489,821 A | 1/1970 | Witt et al. |
| 3,642,950 A | 2/1972 | O'Shea |
| 3,711,575 A | 1/1973 | Kakefuda et al. |
| 3,780,140 A | 12/1973 | Hammer |
| 3,808,180 A | 4/1974 | Owens |
| 3,944,631 A | 3/1976 | Yu et al. |
| 4,067,829 A * | 1/1978 | Garrett |
| 4,111,876 A | 9/1978 | Bailey et al. |
| 4,151,226 A | 4/1979 | Morinaga et al. |
| 4,248,778 A | 2/1981 | Arnold et al. |
| 4,451,584 A | 5/1984 | Schaefer |
| 4,517,339 A | 5/1985 | Aliberto et al. |
| 4,537,933 A | 8/1985 | Walker et al. |
| 4,576,860 A | 3/1986 | Fink et al. |
| 4,722,943 A | 2/1988 | Melber et al. |
| 4,737,532 A | 4/1988 | Fujita et al. |
| 4,769,391 A | 9/1988 | Wycech |
| 4,780,506 A | 10/1988 | Wefer |
| 4,820,361 A | 4/1989 | McKenzie et al. |
| 4,829,094 A | 5/1989 | Melber et al. |
| 4,831,079 A | 5/1989 | Ting |
| 4,839,394 A | 6/1989 | Champion |
| 4,843,104 A | 6/1989 | Melber et al. |
| 4,985,497 A | 1/1991 | Kamins et al. |
| 5,086,113 A | 2/1992 | Kamins et al. |
| 5,104,934 A | 4/1992 | Udipi |
| 5,210,134 A | 5/1993 | Akkapeddi et al. |
| 5,406,768 A | 4/1995 | Giuseppe et al. |
| 5,441,801 A | 8/1995 | Deaner et al. |
| 5,486,553 A | 1/1996 | Deaner et al. |
| 5,497,594 A | 3/1996 | Giuseppe et al. |
| 5,518,677 A | 5/1996 | Deaner et al. |
| 5,539,027 A | 7/1996 | Deaner et al. |
| 5,814,688 A | 9/1998 | Hilti et al. |
| 5,869,591 A | 2/1999 | McKay et al. |
| 5,883,191 A | 3/1999 | Hughes |
| 5,948,524 A | 9/1999 | Seethamraju et al. |
| 6,054,207 A | 4/2000 | Finley |
| 6,133,349 A | 10/2000 | Hughes |
| 6,251,002 B1 | 6/2001 | Close |
| 6,251,995 B1 | 6/2001 | Heese et al. |
| 6,271,303 B1 | 8/2001 | Uschold |
| 6,316,509 B1 * | 11/2001 | Degerman |
| 6,319,441 B1 | 11/2001 | Yates |
| 6,325,956 B2 | 12/2001 | Chaudhary et al. |

* cited by examiner

Primary Examiner—Morton Foelak
(74) Attorney, Agent, or Firm—Stout, Uxa, Buyan & Mullins, LLP; Frank J. Uxa

(57) ABSTRACT

Foamable compositions are provided including a polymeric component, an encapsulated foaming component in an amount effective in foaming the foamable composition and a wood component in an amount effective as a filler in a foamed composition obtained from the foamable composition. Foamed compositions and methods of producing foamed positions are also provided.

34 Claims, No Drawings

FOAMED COMPOSITES AND METHODS FOR MAKING SAME

BACKGROUND OF THE INVENTION

The present invention relates to foamable compositions, foamed compositions and methods of making foamed compositions. In particular, the invention relates to foamable polymeric compositions including encapsulated blowing agents, foamed polymeric compositions and methods for making foamed polymeric compositions.

Conventional residential, commercial and industrial architecture commonly involve the use of structural and nonstructural components in the assembly of useful articles. These components are often made from wood. Wood can be milled into shaped structural components such as sized lumber, trim, post and beam. Additionally, wood can be used to form structural components that can be assembled with glass to form door and window units.

Lumber, trim, post, beam and assembled profiles or articles (or units) comprising wood have obvious utility and are well adapted for many uses in many residential or commercial installations. However, the wood used in these applications, under certain circumstances, can have problems. Wood can deteriorate due to the effect of fungus and insect attack. Also, wood members suffer from cost problems related to the availability of wood suitable for construction purposes. Furthermore, wood requires substantial upkeep comprising painting or staining.

Foamed thermoplastics containing wood have been used as wood replacements. For example, U.S. Pat. No. 6,054,207 discloses the use of a foamed thermoplastic such as polyvinyl chloride and wood fiber for the purpose of manufacturing high strength composite materials. See also U.S. Pat. Nos. 5,486,553, 5,539,027, 5,406,768, 5,497,594, 5,441,801 and 5,518,677. Such composites are useful in the manufacture of a structural member, such as a hollow profile, that can be used in window and door manufacture. Foamed thermoplastics are more durable and avoid the problems associated with wood. Presently, foamed thermoplastic/wood compositions are formed using various blowing agents. However, the degree of foaming in these thermoplastics presently cannot be well controlled.

It would be advantageous to provide a foamable thermoplastic composition in which the foaming may be more effectively controlled.

SUMMARY OF THE INVENTION

New foamable compositions, foamed compositions and methods for making foamed compositions have been discovered. The present invention advantageously provides foamed compositions with one or more beneficial properties, such as durability, weatherability and the like. The present invention provides for polymeric foamable (and foamed) compositions in which the foaming may be more effectively controlled, for example, relative to using a conventional blowing agent. Advantageously, in accordance with the present invention, the amount or degree of cooling needed to slow down or terminate foaming is reduced, and/or the degree to which this final product needs to be reshaped or calibrated is reduced. The present invention is relatively straight forward, easy to practice and provides highly desirable products.

In accordance with one broad aspect of the present invention, foamable compositions are provided comprising a polymeric component, and an encapsulated foaming component in an amount effective in foaming the foamable composition. A wood component preferably is included in an amount effective as a filler in a foamed composition obtained from the foamable composition. Preferably, the foamed compositions derived from the foamable compositions are weatherable.

In one embodiment, the polymeric component comprises a thermoplastic polymer, more preferably a polymer derived from one or more ethylenically unsaturated monomers. Non-limiting examples of polymeric components include: acrylonitrile/styrene/acrylic polymeric materials, acrylonitrile/butadiene/styrene polymeric materials, polyacetyl materials, acrylic polymeric materials, fluorocarbon polymeric materials, nylons, phenoxy polymeric materials, polyolefins, polyethers—such as polyarylethers, chlorinated polyethers, polyethersulfones, and the like, polycarbonates, polyphenylene oxides, polysulfones, polyimides, thermoplastic urethane elastomers and combinations thereof and mixtures thereof. In a preferred embodiment, the polymeric component comprises an acrylonitrile/styrene/acrylic polymeric material.

The encapsulated foaming component preferably is effective to provide for a controlled foaming of the foamable compositions. In one embodiment, an encapsulated foaming component may comprise an encapsulating component and a blowing agent, wherein the encapsulating component encapsulates, for example, substantially or at least partially surrounds, the blowing agent. Advantageously, the encapsulating component comprises a polymer component.

In one embodiment, the encapsulating component comprises a copolymer, for example, a copolymer of ethylene/vinyl acetate.

The blowing agent may be selected from any suitable material effective to function to effect foaming of the present foamable compositions. In one useful embodiment, the blowing agent includes at least one hydrocarbon, such as a hydrocarbon which is volatile at foaming conditions. For example, the blowing agent may comprise at least one saturated aliphatic hydrocarbon having about 3 carbon atoms to about 8 carbon atoms per molecule. In a very useful embodiment, the blowing agent may comprise one or more lower alkanes, for example, isopentane.

The foamable compositions preferably further comprise a wood component to provide, for example a wood-like appearance to the resulting foamed composition. For example, the wood component is present as particles having a size in a range of about 40 U.S. mesh to about 200 U.S. mesh. In one embodiment, the wood component is selected from pine wood, woods softer than pine wood and combinations thereof and mixtures thereof.

In one embodiment, compositions are provided which comprise an acrylonitrile/styrene/acrylic polymeric material and an encapsulated foaming component. The acrylonitrile/styrene/acrylic polymeric material may include an interpolymer and/or a terpolymer and/or a physical mixture of polymer components. For example, the inventive compositions may comprise a physical blend having a substantially uniform make-up and including (1) a physical mixture of at least about 30% by weight, based on the total weight of the physical mixture, of an uncross-linked acrylonitrile/styrene copolymer and at least about 5% by weight, based on the total weight of the physical mixture, of a cross-linked alkyl acrylate/graft (meth)an acrylate copolymer and (2) an encapsulated foaming component. The acrylic copolymer may be a crossed-linked alkyl acrylate/graft (meth) acrylate copolymer, for example a cross-linked n-butyl acrylate-containing copolymer and methyl methacrylate-containing polymer.

In a useful embodiment, the foamable compositions may include a vinyl chloride polymer in an amount effective to enhance the flame retardancy of the foamed composition dependant from the foamable composition relative to a substantially identical foamed composition made without the vinyl chloride polymer.

In a preferred embodiment, foamable compositions of the present invention comprises an acrylonitrile/styrene/acrylic polymeric material, an encapsulated foaming component and a wood component in an amount effective as a filler in the foamed composition derived or obtained from the foamable composition.

In one embodiment, methods for forming foamable polymeric compositions are provided. The methods comprise the steps of providing a polymeric component, providing an encapsulated foaming component and forming a substantially uniform physical mixture including the polymeric component and the encapsulated foaming component. In one embodiment, the methods further comprise the step of providing a wood component prior to the forming step.

Methods for forming foamed compositions are also provided. The methods comprise the steps of forming a foamable composition comprising a polymeric component and an encapsulated foaming component, and preferably a wood component; and causing the foamable composition to be formed into a foamed composition.

Any and all features described herein and combinations of such features are included within the scope of the present invention provided that the features of any such combination are not mutually inconsistent.

These and other aspects of the present invention are apparent in the following detailed description of the invention.

DETAILED DESCRIPTION

The present foamable compositions may be used to form various foamed compositions, for example structural materials or articles. The present foamable compositions may be used to form weatherable, impact resistant foamed compositions. As used herein, the term "weatherable" refers to the ability or property of a material to effectively withstand the conditions of an out-of-doors environment over a long period of time, for example, at least five years and preferably at least seven years, with substantially no degradation or decomposition. In one embodiment, the present compositions, alone or in combination, e.g., as a composite, laminate and the like, with one or more other materials can be used to produce articles, such as window coverings, house sidings, and other articles which are resistant to the effects of outdoor weather on a long term basis and, therefore, can be employed out-of-doors. The present compositions can be molded, extruded and/or otherwise formed into shapes and configurations useful in producing such finished product articles. Such finished product articles can include only the compositions of the present invention or can be composites or other combinations of the present compositions with other materials. In one embodiment, the foamable compositions may be used to cap an article.

In one aspect of the present invention, foamable compositions are provided which comprise a polymeric component and an encapsulated foam component. In one embodiment, the compositions further comprise a wood component in an amount effective as a filler in the composition. Preferably, the compositions of the present invention are weatherable compositions.

In one embodiment, a composition in accordance with the present invention comprises about 60% to about 99%, preferably about 70% to about 99%, of a polymeric component. The polymeric component may comprise a polymer derived from ethylenically unsaturated monomers. Examples of ethylenically unsaturated olefinic monomers include, without limitation: monoolefinic hydrocarbons, i.e. monomers containing substantially only carbon and hydrogen, including such materials as ethylene, ethylcellulose, propylene, 3-methylbutene-1,4-methylpentene-1, pentene-1,3,3-dimethylbutene-1,4,4-dimethylbutene-1, octene-1, decene-1, styrene and its nuclear alpha-alkyl or aryl substituted derivatives, e.g., o-, C or p-methyl, ethyl, propyl or butyl styrene, alpha-methyl, ethyl, propyl or butyl styrene, phenyl styrene, and halogenated styrenes such as alpha-chlorostyrene and the like; monoolefinically unsaturated esters including vinyl esters, e.g., vinyl propionate, vinyl butyrate, vinyl stearate, vinyl benzoate, vinyl-p-chlorobenzoates and the like, alkyl methacrylates, e.g., methyl, ethyl, propyl, butyl, octyl and lauryl methacrylates and the like; alkyl crotonates, e.g., octyl crotonates and the like, alkyl acrylates, e.g., methyl, ethyl, propyl, butyl, 2-ethylhexyl, stearyl, hydroxyethyl and tertiary butylamino acrylates and the like, isopropenyl esters, e.g., isopropenyl acetate, isopropenyl propionate, isopropenyl butyrate, isopropenyl isobutyrate and the like, isopropenyl halides, e.g., isopropenyl chloride and the like; vinyl esters of halogenated acids, e.g., vinyl alpha-chloroacetate, vinyl alpha-chloropropionate, vinyl alpha-bromopropionate and the like; allyl and methallyl compounds, e.g., allyl chloride, allyl alcohol, allyl cyanide, allyl chlorocarbonate, allyl nitrate, allyl formate and allyl acetate and the corresponding methallyl compounds and the like; esters of alkenyl alcohols, e.g., beta-ethyl allyl alcohol, beta-propyl allyl alcohol and the like; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate, ethyl alpha-iodoacrylate and the like; alkyl alpha-cyanoacrylates, e.g., methyl alpha-cyanoacrylate, ethyl alpha-cyanoacrylate and the like, maleates, e.g., monomethyl maleate, monoethyl maleate, dimethyl maleate, diethyl maleate and the like; fumarates, e.g., monomethyl fumarate, monoethyl fumarate, dimethyl fumarate, diethyl fumarate and the like, diethyl glutaconate and the like, monoolefinically unsaturated organic nitriles including, for example, fumaronitrile, acrylonitrile, methacrylonitrile, ethacrylonitrile, 1,1-dicyanopropene-1,3-octenonitrile, crotononitrile, oleonitrile and the like, monoolefinically unsaturated carboxylic acids, anhydrides and amides including, for example, acrylic acid, methacrylic acid, crotonic acid, 3-butenoic acid, cinnamic acid, maleic acid, fumaric acid, itaconic acid, maleic anhydride, corresponding amides and the like, vinyl alkyl ethers and vinyl ethers, such as vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like, and vinyl sulfides, e.g., vinyl beta-chloroethyl sulfide, vinyl beta-ethoxyethyl sulfide and the like, and mixtures thereof.

In one embodiment, the polymeric component comprises a thermoplastic polymer (or thermoplastic resin). A large variety of thermoplastic polymers can be used to form the composition of the present invention. Examples of thermoplastic polymers include vinyl polymeric material and condensation polymeric materials. See Finley U.S. Pat. No. 6,054,207, the disclosure of which is incorporated in its entirety herein by reference. Vinyl polymers are typically manufactured by the polymerization of monomers having an ethylenically unsaturated olefinic group. Condensation polymer resins are typically prepared by a condensation polymerization reaction which is typically considered to be a stepwise chemical reaction in which two or more molecules combined, often but not necessarily accompanied by the separation of water or some other simple typically volatile substance. If a polymer is formed, the process is called polycondensation. A large variety of vinyl polymeric materials can be used to form the present compositions. Useful vinyl polymers are polymers made by homopolymerization, copolymerization or terpolymerization methods. Suitable homopolymers include polyolefins such as polyethylene, polypropylene, poly-1-butene, and the like and mixtures thereof (which term is meant to include combinations thereof), polyvinylchloride; polymethacrylate; polymethylmethacrylate; and the like and mixtures thereof. Also useful are copolymers of alpha-olefins with second monomers such as ethylene-propylene copolymers, ethylene-hexylene copolymers, ethylene-methacrylate copolymers, ethylene-methacrylate copolymers and the like and mixtures thereof.

A certain class of thermoplastic include styrenic copolymers. The term styrenic copolymer indicates that styrene may be copolymerized with a second vinyl monomer resulting in a vinyl polymer. Such materials preferably contain at least about 5 mole percent styrene and the balance being one or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability. Condensation polymer resins that may be used to form the compositions of the present invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Useful condensation engineering resins include polycarbonate materials, polyphenyleneoxide materials, and polyester materials including polyethylene terephthalate, polybutylene terephthalate, polyethylene naphthalate, polybutylene naphthalate materials and the like and mixtures thereof. Polycarbonate engineering resins are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene ($COCl_2$). Polycarbonates may be made with phthalate monomers introduced into the polymerization extruder to improve properties such as heat resistance, further trifunctional materials may also be used to increase melt strength or extrusion blow molded materials. Polycarbonates may often be used as a versatile blending material as a component with other commercial polymers in the manufacture of alloys. Polycarbonates may be combined with polyethylene terephthalate acrylonitrile-butadiene-styrene (resins), styrene maleic anhydride (resins) and others. Preferred alloys comprise a styrene copolymer and a polycarbonate. The melt indices for the polycarbonate materials may be between about 0.5 g/10 min and about 7 g/10 min, preferably between about 1 g/10 min and about 5 g/10 min.

A variety of polyester condensation polymer materials including polyethylene terephthalate, polybutylene terephthalate, polyethylene naphthalate, polybutylene naphthalate, etc. can be useful in the engineering resin wood fiber thermoplastic composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate or 2,6 dicarboxy naphthalene. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher glass transition temperature (Tg) and higher stability at high temperature compared to the terephthalate materials. However, all these polyester materials are useful in the composite structural materials of the invention. Such materials have a preferred molecular weight characterized by melt flow properties. Useful polyester materials may have a viscosity at about 265° C. of about 500 centipoise (cp) to about 2000 cp, for example, about 800 cp to about 1300 cp. Polyphenylene oxide materials are engineering thermoplastics that are useful at temperature ranges as high as about 330° C. Polyphenylene oxide has excellent mechanical properties, dimensional stability, and dielectric characteristics. Commonly, phenylene oxides are manufactured and sold as polymer alloys or blends when combined with other polymers or fibers. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, for example, nylon 6-6, alloys with polystyrene, high impact styrene and others. A certain melt index for the polyphenylene oxide material useful in the invention may range from about 1 g/10 min to about 20 g/10 min, for example, about 5 g/10 min to about 10 g/10 min. The melt viscosity may be about 1000 cp at about 265° C.

The polymeric component may also comprise an alloy of vinyl and condensation polymer resins. Examples of such alloys include: acrylonitrile-butadiene-styrene (ABS), polyacetyl (resins), polyacrylic resins, fluorocarbon resins, nylon, phenoxy (resins), polybutylene (resins), polyarylether such as polyphenylether, polyphenylsulfide materials, polycarbonate materials, chlorinated polyether resins, polyethersulfone (resins), polyphenylene oxide (resins), polysulfone (resins), polyimide (resins), thermoplastic urethane elastomers and many other materials.

In one embodiment, the polymeric component comprises an acrylonitrile/styrene/acrylic polymeric material. The acrylonitrile/styrene/acrylic polymeric material includes an interpolymer, for example, an interpolymer formed by an emulsion polymerization process. The acrylonitrile/styrene acrylic polymeric material may also include a terpolymer, for example, a terpolymer having units derived from styrene, acrylonitrile and at least one component selected from the group consisting of acrylates, methacrylates and mixtures thereof. See Hughes U.S. patent application Ser. No. 09/488,172, the disclosure of which is incorporated in its entirety herein by reference.

In one embodiment, the compositions comprise an acrylic copolymer, for example, in addition to an acrylonitrile/styrene/acrylic polymeric material, in an amount effective to the enhance the impact resistance of the composition relative to a substantially identical composition without the acrylic copolymer. For example, the acrylic copolymer may be a crossed-linked alkyl acrylate/graft (meth)acrylate copolymer. In one embodiment, the cross-linked alkyl acrylate/graft (meth)acrylate copolymer includes cross-linked n-butyl acrylate-containing copolymer and methyl methacrylate-containing polymer.

In one embodiment, the compositions comprise a vinyl chloride polymer, for example, in addition to a acrylonitrile/styrene/acrylic polymeric material, in an amount effective to enhance the flame retardancy of the composition relative to a substantially identical composition without the vinyl chloride polymer.

In a broad embodiment, an encapsulated foaming component is useful in providing a controlled foaming of the composition. Without wishing to limit the invention to any theory or mechanism of operation, it is believed that because the blowing agents are encapsulated, the blowing agents may be released more slowly and more controllably to give more controlled foaming. For example, because of the slower foaming, the cooling required to terminate the foaming process may be reduced. Also, the slower foaming allows for enhanced foaming control and/or a reduced need for calibration or reshaping of the extruded product to form the final, desired profile of the foamed composition. Advantageously, such a "controlled release" is effective in forming foamed materials which include wood.

In one embodiment, a foaming composition of the present invention comprises (by weight) about 0.1% to about 5%, for example, about 0.2% to about 4.5%, or about 0.25% to about 4.0%, of an encapsulated foaming component.

In one embodiment, an encapsulated foaming component comprises small particles, for example, microparticles, such as microspheres and the like. In one embodiment, the encapsulated foaming component comprises an encapsulating component and a blowing agent. See Wycech, U.S. Pat. No. 4,769,391 and see Melber et al, U.S. Pat. No. 4,843,104. The disclosure of each of these two patents is incorporated in its entirety herein by reference.

The encapsulating component (or coat) comprises a polymer component, which includes a variety of polymers. These polymers include, for example, ethylene/vinyl acetate, polyvinylidene chloride, polyacrylonitrile, polyalkyl methacrylates, polystyrene, vinyl chloride and mixtures thereof. In one embodiment, the encapsulating component comprises a copolymer. In one embodiment, the encapsulating component comprises a copolymer of ethylene/vinyl acetate.

A wide variety of blowing agents may be employed in an encapsulated foaming component. In one embodiment, the blowing agent comprises at least one hydrocarbon. For example, blowing agents useful in this invention include at least one saturated aliphatic hydrocarbon having about 3 carbon atoms to about 8 carbon atoms per molecule. For example, lower alkanes including propane, butane, pentane (e.g., isopentane) and the like, and mixtures thereof are very useful. See Melber et al, U.S. Pat. No. 4,843,104 and see Wycech, U.S. Pat. No. 4,769,391.

In unexpanded form, the encapsulated foaming component may be made in a variety of sizes, those readily available in commerce being most often on the order of about 2 microns to about 20 microns, for example, about 3 microns to about 10 microns. It is possible to make encapsulated foaming component in a wider range of sizes. It has been demonstrated, for example, that encapsulated foaming component can be made from as small as about 0.1 micron, up to as large as about 1 millimeter, in diameter, before expansion.

While variations in shape are possible, the available encapsulated foaming component are generally hollow, for example, substantially rounded particles, substantially spherical particles and the like, with the central cavity containing the blowing agent being generally centrally located. Dry, unexpanded encapsulated foaming component may have a displacement density of just greater than about 1, for example, about 1.1. When such encapsulated foaming components are expanded, they are typically enlarged in diameter by a factor of about 5 times to about 10 times the diameter of the unexpanded beads, giving rise to a displacement density, when dry, of about 0.1 or less, for example, about 0.03 to about 0.06.

An encapsulated foaming component useful for this invention is sold by Expancel of Sundsvall, Sweden under the trade name Expancel 092 MB 120. This encapsulated foaming component comprises an ethylene/vinyl acetate encapsulating component and isopentane blowing agent.

In one embodiment, the encapsulated foaming component may be uniformly distributed in the composition to allow for a uniform distribution of density in the article formed from the composition. In one embodiment, the concentration of the encapsulated foaming component is not uniformly distributed to allow for some regions of the articles formed by the composition to be more or less dense than other regions.

In one embodiment, the composition further comprises a wood component. The wood component may be present in the present compositions in an amount in a range of about 0.5% to about 70% by weight, for example, about 1% to about 40% by weight, based on the total weight of the composition. The wood component may be present in any suitable form. For example, the wood may be present as wood particles, such as wood chips, wood flakes, sawdust, wood flour, and the like and mixtures thereof. Such particles may have a size in the range of about 40 U.S. mesh to about 200 U.S. mesh, for example, about 50 U.S. mesh to about 150 U.S. mesh.

Very useful results are obtained with the wood component being selected from pine wood, woods softer than pine wood, such as fir wood and the like and mixtures thereof. The wood component may also include a wood which is harder than pine wood, such as oak wood, walnut wood, hickory wood, maple wood and the like and mixtures thereof. One embodiment of the present invention includes a wood component which includes a first wood at least as soft as pine wood and a second wood harder than pine wood. In this embodiment, the first wood preferably is present as a major amount, that is at least about 50% of the total wood present, while the relatively hard wood is present in a minor amount, that is less than about 50% of the total wood present. The wood component may act to reinforce the present compositions.

In one aspect of the present invention, compositions are provided which comprise substantially uniform blends of a polymeric component, an encapsulated foaming component, and filler component, preferably wood. The polymeric component may comprise a uniform blend of at least about 60% to about 80% by weight (based on the total weight of the polymeric component) of an uncross-linked acrylonitrile/styrene copolymer and at least about 5% to about 25% by weight (based on the total weight of the polymeric component) of the cross-linked alkyl acrylate/graft (meth) acrylate copolymer. The encapsulated foaming component is present in an amount effective to provide for the desired degree of density in the composition. The wood component is present in an amount effective as a filler in the final composition. The specific amount of wood component included may be similar to or on the same order as the amount of such components used as fillers in conventional ASA or other polymeric materials.

In one embodiment, the polymeric component comprises a uniform blend of about 30% to about 95% by weight (based on the total weight of the copolymers) of acrylonitrile/styrene copolymer, and about 5% to about 70% by weight (based on the total weight of the copolymers) the cross-linked alkyl acrylate/graft (meth)acrylate copolymer.

The uncross-linked acrylonitrile/styrene copolymers useful in the present invention may have an acrylonitrile content in the range of about 20% to about 40% by weight, and a styrene content in the range of about 60% to about 80% by weight.

The uncross-linked acrylonitrile/styrene copolymeric component can be produced by polymerization, e.g., emulsion or suspension polymerization, of a mixture of acrylonitrile and styrene. See, for example, Yu et al, U.S. Pat. No. 3,944,631 the disclosure of which is incorporated in its entirety herein by reference.

Uncross-linked or linear acrylonitrile/styrene copolymers are commercially available. Such commercially available copolymers are useful in the present invention. Using such commercially available copolymers may reduce the capital investment needed to commercially practice the invention. In addition, purchasing such acrylonitrile/styrene copolymers, which can be routinely analyzed using conventional techniques, may eliminate the economic risk of making copolymers which do not have the desired properties. Examples of useful commercially available uncross-linked acrylonitrile/styrene copolymers include materials sold under the trademark Blendex 570 and Tyril 860 sold by GE Specialty Chemicals and Dow Chemical, respectively. A commercially available uncross-linked, linear acrylonitrile/styrene copolymer is sold by Bayer under the trademark Lustran, e.g., Lustran 31.

The cross-linked alkyl acrylate/graft (meth)acrylate copolymers included in the compositions of the present invention may be multistage elastomers comprised of a cross-linked alkyl acrylate which is graft linked to a poly (meth)acrylate, preferably polymethyl (meth)acrylate. The cross-linked alkyl acrylate/graft (meth)acrylate copolymer may include an alkyl acrylate portion present in a range of about 50% to about 95% by weight of the copolymer, and a (meth) acrylate portion present in a range of about 5% to about 50% by weight of the copolymer The cross-linked alkyl acrylate portion of the cross-linked alkyl acrylate/graft (meth) acrylate may be a copolymer containing a major proportion, that is at least 50% by weight, of alkyl and/or aralkyl acrylates, with the inclusion of about 0.05% to about 50% by weight of a polyunsaturated cross-linking comonomer and 0% to about 10% by weight of a hydrophilic comonomer, ordinarily polymerized from an emulsion or suspension. The alkyl esters of acrylic acid have alkyl groups of about 1 carbon atom to about 15 carbon atoms, for example, about 1 carbon atom to about 8 carbon atoms. Longer chain alkyl groups may be used. Other acrylic monomers, up to about 50 weight percent, less other inclusions, can also be used, such as aralkyl esters of acrylic acid wherein the cyclic portion may contain 5, 6 or 7 carbon atoms with or without an additional alkyl bridge, and the alkyl portion of the aralkyl group containing up to about 15 carbon atoms may also be used. Substituted acrylates or methacrylates including alkylthioalkyl acrylates such as ethyithioethyl acrylate and the like, alkoxyalkyl acrylates, such as methoxyethyl acrylate and the like, may also be used. Interpolymers with these acrylates may be based on up to about 40% by weight of one or more other addition polymerizable monomers such as styrene, alpha-methyl styrene, vinyl ethers, amides, and esters, vinyl and vinylidene halides and the like.

The (meth)acrylate portion of the cross-linked alkyl acrylate/graft (meth)acrylate copolymers may be characterized as having the majority (e.g., 50% to 100%) of alkyl (meth)acrylate units. The alkyl (meth)acrylate polymers may contain minor amounts (0% to about 40%) of non-acrylic units to provide well-known balances of physical characteristics. These polymers preferably have a heat distortion temperature greater than about 68° F., more preferably greater than about 120° F. The (meth) acrylate portion may include copolymers of about 50% to 100% alkyl methacrylate, wherein the alkyl group contains 1 to 4, preferably 1, carbon atoms, and 0% to about 50% of one or more other acrylic monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters and other substituents, and 0% to about 40% of other unsaturated monomers including vinyl esters, vinyl ethers, vinyl amides, vinyl ketones, vinyl halides, vinylidene halides, olefins and the like.

Among the hydrophilic monomers which may be included in the cross-linked alkyl acrylate/graft (meth) acrylate copolymers may be, by way of example only, hydroxy-substituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, and methacrylic acid, acrylamide, methacrylamide and the like.

Graft-linking monomers useful in producing the present cross-linked alkyl acrylate/graft (meth)acrylic copolymers, by way of example only, include allyl group containing compounds, such as allyl esters of ethylenically unsaturated acids, for example, allyl acrylate, allyl methacrylate, diallyl maleate, diallyl fumarate, allyl acid itaconate and the like.

The cross-linked alkyl acrylate/graft (meth)acrylate copolymers preferably include cross-linked n-butyl acrylate-containing polymers and/or methyl methacrylate-containing polymers. In one embodiment, the cross-linked alkyl acrylate/graft (meth)acrylate copolymer comprises a two stage polymer having a cross-linked n-butyl acrylate-based rubbery core and a second stage polymerized from methyl-methacrylate alone or in combination with styrene.

Cross-linked alkyl acrylate/graft (meth)acrylate copolymers may include the core-shell polymers of the type available from Rohm & Haas Co. under the trademark Acryloid7 KM330 and KM334. These components contain units derived from n-butyl acrylate, alone or in combination with a vinyl aromatic compound. Components of this type are disclosed in Owens, U.S. Pat. No. 3,808,180, the disclosure of which is incorporated in its entirety herein by reference.

In another aspect of the invention, the compositions comprise substantially uniform blends of a polymeric component, for example interpolymer ASA, and an encapsulated foaming component, for example an encapsulated foaming component. The composition, in one embodiment, includes the interpolymer in a range of about 5 to about 95% by weight of the composition mixture. For example, the composition may include the interpolymer in a range of about 25% to about 40% by weight of the composition mixture. In one embodiment, the composition further comprises a filler component, for example, wood. The wood component may be present in an amount effective as a filler in the final composition. The specific amount of wood component included may be similar or on the same order as the amount of such components used as fillers in conventional ASA or other polymeric materials.

Interpolymer ASA of various types are available from several commercial sources. However, for a good balance of overall properties, including impact, tensile and flexural properties, it is particularly preferred that the selected ASA resin is an interpolymer (i.e. interpenetrating network) comprised of crosslinked (meth)acrylate, crosslinked styrene-acrylonitrile, and uncrosslinked styrene-acrylonitrile components. The term Ainterpolymer comprised of crosslinked (meth)acrylate, crosslinked styrene-acrylonitrile, and uncrosslinked styrene-acrylonitrile components may encompass the type of interpolymer composition described in Yu et al U.S. Pat. No. 3,944,631, the disclosure of which is hereby incorporated in its entirety by reference. The aforementioned alkyl acrylate, crosslinked styrene-acrylonitrile and uncrosslinked styrene-acrylonitrile polymers may be alternating copolymers, random copolymers, or block copolymers. Additionally, the alkyl acrylate polymer may also be a homopolymer. Furthermore, the crosslinked alkyl acrylate and crosslinked styrene-acrylontrile may be of the following non-limiting conformations: branched, network, star, comb, ladder or semiladder.

The interpolymer may be formed by a polymerization process. Commercially available interpolymers which are formed by polymerzation include those sold under the trademarks ASA/Blendex 984 (GE Specialty Chemicals), ASA/Centrex 811 (Bayer), ASA/Luran (BASF), and ASA/ LI 911 (LG Chemical/Korea).

In one aspect of this invention, the interpolymer ASA is preferably formed by the polymerzation process identified in U.S. Pat. No. 3,944,631 and U.S. patent application Ser. No. 09/488,172, the disclosure of each of this patent and this patent application is incorporated in its entirety herein by reference.

In yet another aspect of the invention, the compositions comprise substantially uniform blends of terpolymer ASA and an encapsulated foaming component. In one embodiment, the compositions further comprise a filler component, for example wood. The amount of terpolymer ASA in a blend with, an encapsulated foaming component and wood may range from less than about 1% to more than about 99%, by weight.

Various types of terpolymer ASAs are available from several commercial sources. Such terpolymer ASA's are polymeric materials including units derived from styrene, and/or a derivative thereof, acrylonitrile and acrylate and/or methacrylate monomers.

Suitable terpolymer ASA's are disclosed in Morinaga et al, U.S. Pat. No. 4,151,226, which is incorporated in its entirely herein by reference, as described elsewhere herein.

One ASA terpolymer material includes about 58.4% by weight of styrenic units, about 23.3% by weight acrylonitrile units, and about 18.3% by weight acrylate units.

Optionally, the compositions of this invention may further contain effective amounts of one or more additional agents, such as vinyl chloride polymer, glassy amorphous polymer, impact resistance modifiers, for example, acrylic copolymers, such as elastomers of crosslinked alkyl acrylate/graft (meth) acrylate, ethylene-containing polymeric components, such as ethylene/propylene copolymer, ethylene/(meth)acrylate copolymers and the like, as described above. Compositions of this invention may also include effective amounts of conventional pigments, processing aides, lubricants, antioxidants and stabilizers such as ultraviolet light stabilizers and thermal stabilizers, and the like.

In one embodiment, the present compositions include a vinyl chloride polymer and/or a glassy amorphous polymer. Based on the composition weight, the compositions may include ASA polymeric material from about 25% to about 90% or more; an encapsulated foaming component in an amount sufficient to provide for the desired density, a wood component in an amount effective to provide a desired wood-like look and texture; the vinyl chloride polymer may be present in an amount in a range of about 0% to about 50%; and/or the glassy amorphous polymer may be present in an amount of about 0% to 40%.

The terminology "vinyl chloride polymer", as used here, is meant to encompass polyvinyl chloride homopolymers, as well as the copolymers of vinyl chloride with comonomers polymerizable therewith, with the former monomer predominating the latter in amount. Such comonomers include vinyl esters of carboxylic acids, such as vinyl acetate, the $C_1$–$C_{20}$ alkyl esters of acrylic and methacrylic acid, the aryl, halo- and nitro- substituted benzyl esters of acrylic and meth acrylic acid, the ethylenically unsaturated mono- and dicarboxylic acids, and the like.

The term "glassy amorphous polymer" as used here, is intended to encompass those resins which are non-rubber modified, non-crystalline, and have good mechanical, thermal, and hardness properties. Details regarding the structure of these polymeric materials as well as the processes for forming them are available from a number of sources. Some of the representative polymers which are included in this class of plastics are acrylic resins such as polymethyl methacrylate, polyethyl acrylate, polybutyl acrylate, polystyrene, and poly-alpha-methyl styrene. Copolymers of glassy amorphous polymerizable monomers are also intended to be encompassed, e.g., copolymers of styrene with methylmethacrylate or acrylonitrile. Some commercially available acrylic resins include those sold under the following trademarks: Lucite (E. I. duPont de Nemours and Co.); and Plexiglas (Rohm and Haas Co.). Some commercially available styrene-acrylonitrile polymers are available under the following trademarks: Tyril (Dow Chemical) and Lustran (Monsanto).

In another embodiment, the present compositions include an increased amount of lubricant relative to the amount of lubricant included in a similar composition without filler, for example, wood. Such increased amount of lubricant is effective in facilitating forming a substantially uniform physical blend of the components of the present composition, particularly, since the wood being employed is often relatively dry and/or relatively incompatible with the copolymeric components of the compositions. Without wishing to limit the invention to any particular theory of operation, it is believed that the lubricant acts to wet the surface of the wood and/or to facilitate the physical mixing of the components of the present compositions. The amount of lubricant used preferably increases as the amount of wood increases. The amount of lubricant used may vary widely depending on the specific lubricant employed. The amount of lubricant employed may be in a range of about 0.1% to about 5% or about 0.5% to about 5%, or about 0.5% to about 2% by weight of the total composition.

In another broad aspect of the present invention, methods for forming the inventive compositions are provided. Such methods may comprise providing a polymeric component, for example an acrylonitrile/styrene/acrylate polymeric material; providing an encapsulated foaming component; providing a wood component; and forming a substantially uniform physical blend of the polymeric component (for example acrylonitrile/styrene/acrylic polymeric material), encapsulated foaming component and the wood component.

In one embodiment, a method for producing a foamed composition is provided. The method comprises the steps of forming a foamable composition comprising a polymeric component, an encapsulated foaming component and a wood component; and causing the foamable composition to be formed into a foamed composition. Thus, foamed compositions derived from a foamable composition may be formed.

The present forming step may include subjecting the mixture of the polymeric component (for example acrylonitrile/styrene/acrylic polymeric material) and the encapsulated foaming component to conditions effective to produce a substantially uniform, flowable or extrudable composition. Other additives may also be added. Such conditions may include, for example, elevated temperature conditions, elevated pressure conditions, shear or mixing conditions and combinations thereof. The forming step may further include extruding the substantially uniform composition, in particular, extruding the substantially uniform, flowable or extrudable composition, into useful shapes and configurations. In one embodiment, a wood component is also added to the mixture to blend uniformly therein. Preferably, the compositions formed are weatherable compositions.

One particular method of the present invention for forming a composition includes providing an uncross-linked acrylonitrile/styrene copolymer; providing a cross-linked alkyl acrylate/graft (meth)acrylate copolymer; providing an encapsulated foaming component and forming a substantially uniform physical blend of these two copolymers and the filler particles. This physical blend may be substantially free of cross-linked acrylonitrile/styrene copolymer. In one embodiment, the methods further include the step of providing filler component particles before the forming step. In one useful embodiment, the compositions formed are weatherable compositions.

The present forming step may include subjecting a mixture of the polymeric component (for example, uncross-linked acrylonitrile/ styrene copolymer, alkyl acrylate/graft (meth)acrylate copolymer), encapsulated foaming component, and optionally filler component particles to conditions effective to produce a substantially uniform, flowable or extrudable composition. In one embodiment, the forming step includes extruding the substantially uniform physical composition, in particular, the substantially uniform flowable or extrudable composition.

Blending of the formulation of the present invention can be achieved by any of the well-known polymer blending techniques, such as two-roll or Banbury mixing, single or multiple screw extrusion, or any other method which applies sufficient heat (temperature) and/or pressure and/or shear (mixing) to the ingredients to obtain an uniform blend. Typical temperatures may be in the range of about 300° F. or about 325° F. to about 450° F. or about 475° F., while typical elevated pressures are in a range of about 750 psi or about 750 psi to about 2000 psi or more. At such temperatures and/or pressures, the shear or mixing force typically generated in the above-noted mixing or extrusion systems is sufficient to obtain the desired, substantially uniform blend.

Without wishing to limit the invention to any particular theory of operation, it is believed that the uncross-linked (e.g., linear) acrylonitrile/styrene copolymer is substantially miscible or compatible with the (meth)acrylate of the cross-linked alkyl acrylate/graft (meth) acrylate copolymer at effective blending conditions. Thus, during the blending operation, the two copolymeric components can be combined with the filler component into a substantially uniform combination even though the cross-linked alkyl acrylate may not be miscible or compatible with the uncross-linked acrylonitrile/styrene copolymer. In other words, the (meth)acrylate appears to mitigate against the incompatibility between the uncross-linked acrylonitrile/styrene copolymer and the cross-linked alkyl acrylate. The cross-linked alkyl acrylate/graft (meth) acrylate copolymer provides the acrylic portion of the present ASA polymeric material, wood-containing compositions and, in addition, facilitates the formation of the present substantially uniform, preferably physical, mixtures of copolymers. Moreover, the cross-linked alkyl acrylate/graft (meth)acrylate copolymer is effective to provide beneficial impact resistance to the present compositions.

In order to avoid component incompatibility, the present compositions may be substantially free of cross-linked acrylonitrile/styrene copolymers.

As used herein, the terms "physical blend" or a physical mixture refers to a composition in which the constituent components are combined or mixed with substantially no chemical bonding, in particular with substantially no covalent chemical bonding between the constituents.

In one embodiment, the substantially uniform blend formed includes at least about 30% by weight, based on the total weight of the copolymers present, of the uncross-linked acrylonitrile/styrene copolymer and at least about 5% by weight, based on the total weight of the copolymers present, of the cross-linked alkyl acrylate/graft (meth)acrylate copolymer and an amount of encapsulated foaming component to achieve a desired density. In another embodiment, the uncross-linked acrylonitrile/styrene copolymer is present in an amount in a range of about 30% to about 95% by weight based on the total weight of the copolymer and the cross-linked alkyl acrylate/graft (meth)acrylate copolymer is present in an amount in a range of about 5% to about 70% by weight based on the total weight of the copolymers. In one embodiment, during the forming step, substantially no polymerization occurs. In one embodiment, an amount of filler component particles effective as a filler in the final composition is also added to the composition to form a uniform blend therein.

In one embodiment, polymeric components are formed into pellets (See Examples 1–8 and 13–20). Some pellets may additionally comprise a wood component when a wood particle is added to the formulation. These pellets may be mixed with an encapsulated foaming component to form a foamable composition. The foamable composition may be foamed to form a foamed composition. The foaming may occur in an extruder and the foamed composition is then extruded as a cap material over an article. The foamable composition may be foamed during the extrusion process. The foaming process may also occur after the foamable composition is extruded as a cap material over an article. In one embodiment, the foamable composition is foamed and is extruded as a cap material over an article, and the capping foamed composition may be induced to foam further if necessary.

Advantageously, the foamable compositions of this invention provides for a more controlled foaming. For example, the cooling needed to slow down or terminate foaming is reduced. Furthermore, the degree of foaming may be calibrated.

The following non-limiting examples illustrate some of the advantages of the present invention.

EXAMPLES 1 AND 2

The following formulations for forming polymeric components are prepared by combining the listed ingredients:

|  | Example 1 wt % | Example 2 wt % |
|---|---|---|
| Uncross-linked, linear acrylonitrile/styrene copolymers[1] | 75.86 | 66.88 |
| Cross-linked n-butyl acrylate/graft methyl (meth)acrylate copolymer[2] | 22.38 | 31.59 |
| Lubricant[3] | 1.15 | 1.00 |
| Stabilizer[4] | 0.15 | 0.13 |
| Light stabilizer[4] | 0.30 | 0.27 |
| Antioxidant[4] | 0.15 | 0.13 |

[1]Sold by Bayer under the trademark Lustran 31 (contains about 23% by weight of acrylonitrile).
[2]Sold by Rohm & Haas Co. under the trademark Acryloid KM334, n-butyl acrylate/butylene glycol diacrylate/methyl methacrylate/alkylacrylate
[3]Sold by Struktol Corporation under the trademark TR-251, metal stearate/amide composition effective as lubricant.
[4]Well known, commercially available component.

EXAMPLES 3 AND 4

The following formulations for forming polymeric components are prepared by combining the listed ingredients. Wood particles are also added to the formulation.

|  | Example 3 wt % | Example 4 wt % |
|---|---|---|
| Uncross-linked, linear acrylonitrile/styrene copolymers[1] | 69.5 | 61.6 |
| Cross-linked n-butyl acrylate/graft methyl (meth)acrylate copolymer[2] | 20.4 | 28.6 |
| Wood Particles[5] | 8.0 | 8.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[1], [2], [3] and [4] are shown in Examples 1 and 2.
[5]100 U.S. Mesh pine wood flour.

Each of these formulations of Example 1 to 4 is thoroughly mixed at elevated temperatures of about 400° F.–450° F. (which is the melt temperature range of the copolymer combinations in these formulations) to form a substantially uniform, extrudable composition.

EXAMPLES 5 TO 8

Each of the samples that is produced in Examples 1 to 4 is successfully formed into pellets using a Cincinnati Milacron Model CM-80 conical twin screw extruder and a Beringer Water Ring Pelletizer. In each, the following conditions are employed.

| Barrel Zone 1 | 325° F. |
|---|---|
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365 of |
| Die Zone 4 | 375 of |
| Die Zone 5 | 375 of |
| Screw Oil | 350 of |
| Motor, RPM | 2000 |
| Motor Load, amps | 110 |

EXAMPLES 9 AND 12

A sample of the pellets produced in each of Examples 5 to 8 is placed in an extruder, and about 0.25% to about 5.0% (of the total weight of the melt) of an encapsulated foaming component is added to the molten pellets with intimate mixing. The encapsulated component used in that sold by Expancel of Sundsvall, Sweden under the trade name Expancel 092 MB 120. The molten pellets and encapsulated foaming component form a homogeneous mixture. The mix of molten pellets and the encapsulated foaming component is a foamable composition. The temperature in the extruder is carefully controlled to induce foaming to an appropriate degree and at an appropriate time and place. The foamable composition is foamed into a foamed composition, and it is successfully extruded as a cap material over a rigid acrylonitrile/butadiene/styrene (ABS) foam material using conventional techniques known in the art. See, for example U.S. Pat. Nos. 6,054,207; 5,518,677; 4,769,391; 4,722,943.

The ABS articles capped with the foamed composition produced in the Examples are found to have sufficient weatherability to be used out-of-doors on a long term basis.

EXAMPLES 13 AND 14

The following formulations for forming polymeric components are prepared by combining the listed ingredients.

|  | Example 13 wt % | Example 14 wt % |
| --- | --- | --- |
| acrylonitrile/styrene/acrylic (ASA) interpolymer | 54.9[6] | 55.2[7] |
| Wood Particles[5] | 43.0 | 43.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[3] and [4] are shown in Examples 1 and 2.
[5] U.S. Mesh pine wood flour.
[6] ASA, Blendex 964. Sold by GE Specialty Chemicals.
[7] ASA, Centrex 811. Sold by Bayer.

EXAMPLES 15 AND 16

The following formulations for forming polymeric components are prepared by combining the listed ingredients.

|  | Example 15 wt % | Example 16 wt % |
| --- | --- | --- |
| acrylonitrile/styrene/acrylic (ASA) interpolymer[6] | 50.0 | 45.0 |
| Wood Particles[5] | 8.2 | 3.4 |
| Glassy amorphous polymer[8] | 20.0 | 30.0 |
| Vinyl chloride polymer[9] | 0.0 | 20.0 |
| Acrylic copolymer[2] | 20.0 | 0.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[2], [3] and [4] are shown in Examples 1 and 2.
[5] U.S. Mesh pine wood flour.
[6] ASA, Blendex 984. Sold by GE Specialty Chemicals.
[8] Lucite 147K brand (E. I. duPont de Nemours and Co.)
[9] Geon 103 EPF-76 brand Each of these formulations produced in Examples 13 to 16 is thoroughly mixed at elevated temperatures of about 400° F.–450° F. (which is the melt temperature range of these formulations) to form a substantially uniform, extrudable composition.

EXAMPLES 17 to 20

Each of the samples that is produced in Examples 13 to 16 is successfully formed into pellets using a Cincinnati Milacron Model CM-80 conical twin screw extruder and a Beringer Water Ring Pelletizer. In each, the following conditions are employed.

| Barrel Zone 1 | 325° F. |
| --- | --- |
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365 of |
| Die Zone 4 | 375 of |
| Die Zone 5 | 375 of |
| Screw Oil | 350 of |
| Motor, RPM | 2000 |
| Motor Load, amps | 110 |

EXAMPLES 21 AND 24

A sample of the pellets produced in each of Examples 17 to 20 is placed in an extruder, and about 0.25% to about 5.0% (of the total weight of the melt) of an encapsulated foaming component is added to the molten pellets with intimate mixing. The encapsulated component used is that sold by Expancel of Sundsvall, Sweden under the tradename Expancel 092 MB 120. Preferably, the molten pellets and encapsulated foaming component form a homogeneous mixture. The mix of molten pellets and encapsulated foaming component is a foamable composition. The temperature in the extruder is carefully controlled to induce foaming of the foamable composition to an appropriate degree and at an appropriate time and place. The foamable composition is foamed into a foamed composition, and it is successfully extruded as a cap material over a rigid acrylonitrile/butadiene/styrene (ABS) foam material using a conventional techniques known in the art.

The capped ABS articles produced in the Examples are found to have sufficient weatherability to be used out-of-doors on a long term basis.

A number of patents have been cited herein. The disclosure of each of these patents is incorporated in its entirety herein by reference.

While this invention has been described with respect to various specific examples and embodiments, it is to be understood that the invention is not limited thereto and that it can be variously practiced within the scope of the following claims.

What is claimed is:

1. A foamable composition comprising a thermoplastic polymeric component, an encapsulated foaming component, other than the thermoplastic polymeric component, in an amount effective in foaming the foamable composition and a wood component distributed substantially throughout the foamable composition in an amount effective as a filler in a foamed composition obtained from the foamable composition.

2. The composition of claim 1 wherein the wood component is distributed substantially uniformly throughout the foamable composition.

3. The composition of claim 1 wherein the polymeric component comprises a polymer derived from one or more ethylenically unsaturated monomers.

4. The composition of claim 1 wherein the polymeric component is selected from the group consisting of acrylonitrile/styrene/acrylic polymeric materials, acrylonitrile/butadiene/styrene polymeric materials, polyacetyl materials, acrylic polymeric materials, fluorocarbon polymeric materials, nylons, phenoxy polymeric materials, polyolefins, polyethers, polycarbonates, polyphenylene oxides, polysulfones, polyimides, thermoplastic urethane elastomers, and mixtures thereof.

5. The composition of claim 1 wherein the polymeric component comprises an acrylonitrile/styrene/acrylic polymeric material.

6. The composition of claim 1 wherein the encapsulated foaming component is effective to provide for a controlled foaming of the foamable composition.

7. The composition of claim 1 wherein the encapsulated foaming component comprises a polymer component and a blowing agent, the polymer component encapsulating the blowing agent.

8. The composition of claim 7 wherein the polymer component comprises a copolymer of ethylene/vinyl acetate.

9. The composition of claim 7 wherein the blowing agent comprises at least one hydrocarbon.

10. The composition of claim 7 wherein the blowing agent comprises at least one saturated aliphatic hydrocarbon having about 3 to about 8 carbon atoms per molecule.

11. The composition of claim 1 comprising about 0.01% to about 5% by weight, based on the total weight of the composition, of the encapsulated foaming component.

12. The composition of claim 1 wherein the wood component is present in a form selected from the group consisting of wood chips, wood flakes, sawdust, wood flour and mixtures thereof.

13. A foamed composition comprising a thermoplastic polymeric component and a wood component distributed substantially throughout the foamed composition in an amount effective as a filler in the foamed composition, the foamed composition being derived from a foamable composition containing an encapsulated foaming component, other than the thermoplastic polymeric component, effective in foaming the foamable composition.

14. The composition of claim 13 wherein the wood component is distributed substantially uniformly throughout the foamed composition.

15. The composition of claim 13 wherein the polymeric component is selected from the group consisting of acrylonitrile/styrene/acrylic polymeric materials, acrylonitrile/butadiene/styrene polymeric materials, polyacetyl materials, acrylic polymeric materials, fluorocarbon polymeric materials, nylons, phenoxy polymeric materials, polyolefins, polyethers, polycarbonates, polyphenylene oxides, polysulfones, polyimides, thermoplastic urethane elastomers, combinations thereof and mixtures thereof.

16. The composition of claim 13 wherein the polymeric component comprises an acrylonitrile/styrene/acrylic polymeric material.

17. The composition of claim 13 wherein the encapsulated foaming component comprises a polymer component and a blowing agent, the polymer component encapsulating the blowing agent.

18. The composition of claim 17 wherein the encapsulating component comprises a copolymer of ethylene/vinyl acetate.

19. The composition of claim 13 which is weatherable.

20. A foamable composition comprising an acrylonitrile/styrene/acrylic polymeric material and an encapsulated foaming component.

21. The composition of claim 20 wherein the acrylonitrile/styrene/acrylic polymeric material includes an interpolymer.

22. The composition of claim 20 wherein the acrylonitrile/styrene acrylic polymeric material includes a terpolymer.

23. The composition of claim 20 wherein the acrylonitrile/styrene acrylate polymer material includes a physical mixture of at least about 30% by weight, based on the total weight of the physical mixture, of an uncross-linked acrylonitrile/styrene copolymer and at least about 5% by weight, based on the total weight of the physical mixture, of a cross-linked alkyl acrylate/graft (meth)acrylate copolymer.

24. The composition of claim 23 wherein said cross-linked alkyl acrylate/graft (meth)acrylate copolymer includes cross-linked n-butyl acrylate-containing copolymer and methyl methacrylate-containing polymer.

25. The composition of claim 20 wherein the encapsulated foaming component comprises a polymer component and a blowing agent, the polymer component encapsulating the blowing agent.

26. The composition of claim 20 comprising about 0.01% to about 5% by weight, based on the total weight of the composition, of the encapsulated foaming component.

27. The composition of claim 20 further comprising a wood component in an amount effective as a filler in a foamed composition obtained from the foamable composition.

28. A method for producing a foamed composition, the method comprises the steps of:
    forming a foamable composition comprising a thermoplastic polymeric component, an encapsulated foaming component, other than the thermoplastic polymeric component, and a wood component distributed substantially throughout the foamable composition; and
    causing the foamable composition to be formed into a foamed composition.

29. The method of claim 28 wherein the wood component is distributed substantially uniformly throughout the foamable composition.

30. The method of claim 28 wherein the encapsulated foaming component comprises a polymer component and a blowing agent, the polymer component encapsulating the blowing agent, and the wood component comprises wood particles.

31. The composition of claim 1 in a form of an extrudable composition.

32. The composition of claim 1 wherein the thermoplastic polymeric component is present in an amount in a range of about 60% to about 99% by weight of the composition.

33. The composition of claim 20 in a form of an extrudable composition.

34. The composition of claim 20 wherein the thermoplastic polymeric component is present in an amount in a range of about 60% to about 99% by weight of the composition.

* * * * *